United States Patent [19]

Sedgewick

[11] Patent Number: 4,565,094
[45] Date of Patent: Jan. 21, 1986

[54] APPARATUS FOR PRECISION PLACEMENT AND PARAMETER MEASUREMENT

[76] Inventor: Richard D. Sedgewick, 100 Horne St., Dover, N.H. 03820

[21] Appl. No.: 613,423

[22] Filed: May 24, 1984

[51] Int. Cl.$^4$ .............................................. G01D 11/30
[52] U.S. Cl. ................................. 73/432 R; 33/568; 51/165.81; 51/216 R
[58] Field of Search ................ 73/432 B; 33/174 TA; 51/165.81, 216 R, 216 A, 216 T, 217 R, 217 T, 217 A

[56] References Cited

U.S. PATENT DOCUMENTS

| | | |
|---|---|---|
| 987,237 | 3/1911 | Kerr . |
| 2,397,300 | 3/1946 | Tilton . |
| 3,135,112 | 6/1964 | Farley ............................ 73/432 B |
| 4,457,114 | 7/1984 | Hennenfent ..................... 51/216 R |

Primary Examiner—Stewart J. Levy
Attorney, Agent, or Firm—Daniel H. Kane, Jr.

[57] ABSTRACT

Apparatus is described for precise placement of an object or sensing or measurement of a parameter using a plurality of tilt plates in substantially parallel spaced apart relationship forming a stack. Adjacent pairs of tilt plates in the stack are joined by unitary hinge plates secured to respective edges of each adjacent pair of tilt plates on one side. Each hinge plate is constructed and arranged of rigid elastic material for controlled elastic bending and recovery under applied bending moment stress. A plurality of spreader elements are provided operatively coupled to each pair of adjacent tilt plates at the side opposite the respective hinge plate. A spreader actuator actuates the spreaders for imparting tilting motion to the respective pair of tilt plates by varying the spacing of the pair of adjacent tilt plates relative to each other at one side imparting bending moment stress to the hinge plate on the other side. An object or sensor coupled to the top or end of the stack may be precisely placed, positioned or moved by controlled actuation of the spreaders. Parameters accurately measured by using, for example, temperature sensitive, pressure sensitive or weight sensitive motional response spreader elements. Passive motion sensors or transducers may be substituted for the spreaders for sensing motin or deflection. Strain gauges may be applied to the hinge plates for the same purpose. The apparatus is applied, by way of example, in retrofitting a conventional grinder for fine adjustment and precise placement of a workpiece relative to a working tool. Other applications include work holders, manipulators, robots, measuring instruments, scales, springs, bellows and deflection devices.

21 Claims, 10 Drawing Figures

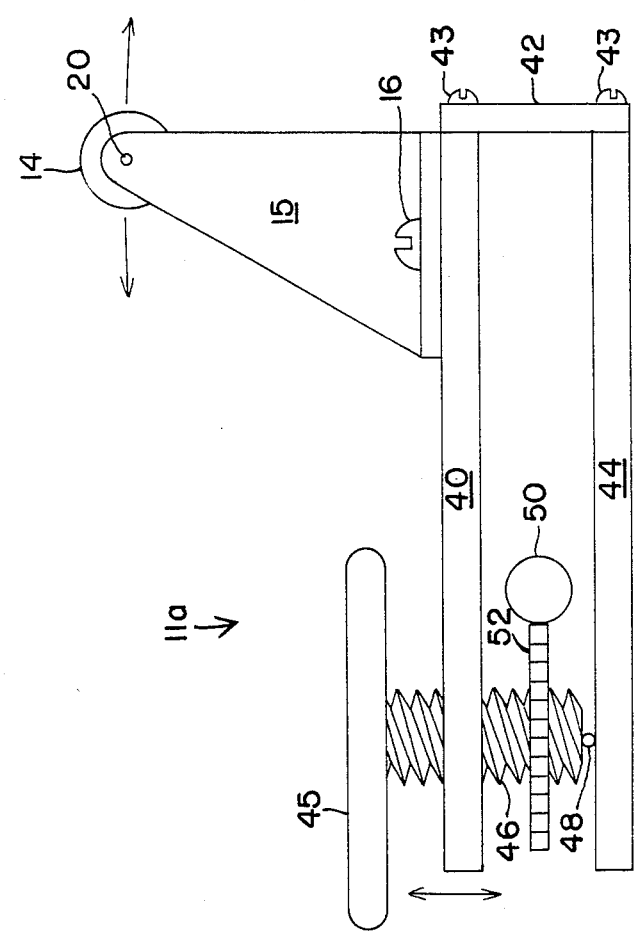

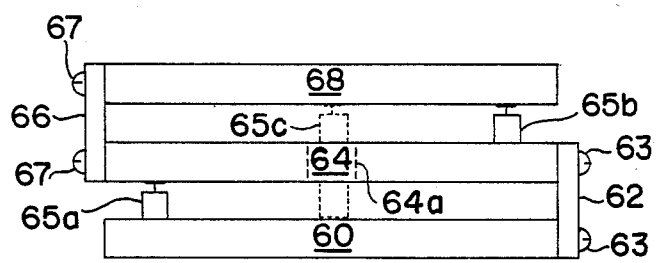
FIG 6
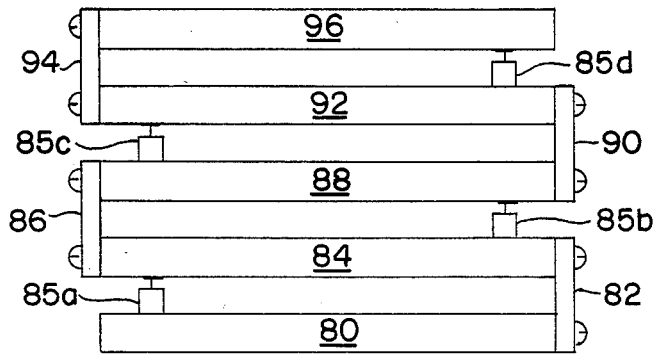
FIG 7
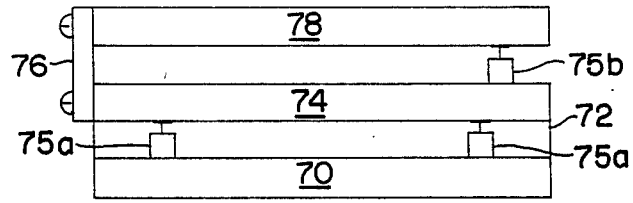
FIG 8
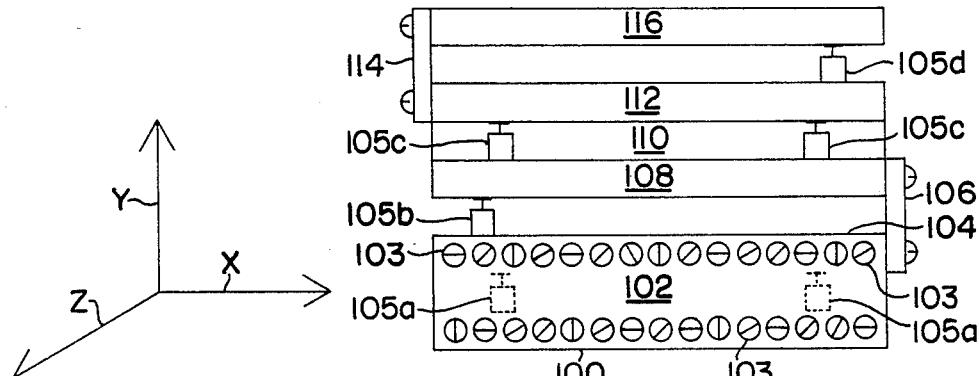
FIG 10
FIG 9

APPARATUS FOR PRECISION PLACEMENT AND PARAMETER MEASUREMENT

TECHNICAL FIELD

This invention relates to a new apparatus for precision placement, movement and positioning of a workpiece or other object or for accurate sensing and measurement of parameters such as weight, pressure, temperature, etc. by motional response. More generally, the invention is useful in a variety of applications including work holders for machining or grinding, micromanipulators, work stations, robotics, measuring instruments, scales, springs, bellows and deflection devices.

BACKGROUND ART

Equipment for precision positioning or measurement to dimensions in the order of 0.0001 inches or centimeters to 0.00005 inches or centimeters is ordinarily not found in machine shops and production facilities. To achieve this level of tolerances, special quality equipment is required with temperature control of all components including the measuring devices. Typically, only equipment with lower tolerances or old and worn equipment is available.

For example, a conventional grinding machine is provided with a movable platform or work holder that slides on ways in order to vary the distance between the workpiece mounted on the work holder and the grinding wheel or other working tool. The translation or sliding movement of the work holder is achieved by a rotating lead screw or hydraulic cylinder. If the diameter of the workpiece is to be reduced by 0.0001 inches or centimeters, the corresponding in-feed movement or positioning of the workpiece must be 0.00005 inches or centimeters, an increment of distance one half as much as the amount that the diameter is to be reduced. To achieve such accuracy and control of tolerances with the conventional or older worn machinery is next to impossible. This degree of accuracy is particularly difficult to achieve if production is involved where one piece after another must be processed.

A conventional grinding machine 10 is illustrated by way of example in FIG. 1. A workpiece 14 to be machined is mounted for rotation between the centers 15 on the rotating axis 20 driven by motor 18. The centers 15 are secured to a translating platform 12 by bolts 16. The platform 12 translates or slides in ways, not shown, and is mounted on threaded sleeve 22 which translates back and forth driven or inspired by the threads of lead screw 24. Lead screw 24 is mounted for rotation within the bearings 26 by means of a handle 25 and manual grip 25A. The manually operated translating platform assembly is in turn mounted on the base 28 of the grinding machine. An extending arm 34 of the machine base 28 supports the grinding wheel 30 or other working tool for rotation on axis 32 driven by motor 35 via belt 36. Due to the limited tolerances of the threaded lead screw 24, sleeve 22, and sliding ways, of work holder platform 12, the dimensional tolerance in placement of the workpiece 14 relative to the working tool 30 is also limited. More generally, the lower cost or worn equipment ordinarily available for placement and positioning of objects for application in work holders, work stations, manipulators, etc., or for motional response sensing and measurement of parameters is limited.

OBJECTS OF THE INVENTION

It is therefore an object of the present invention to provide a new apparatus for retrofitting conventional grinding machines and more generally work holders, manipulators, work stations, etc. for fine adjustment and precision placement, movement and positioning of workpieces and other objects.

Another object of the invention is to provide an apparatus of multiple stages for precision placement and positioning of an object in three dimensions without frictional sliding or movement between the stages which would subject the apparatus to wear and increasing inaccuracy with age and use.

A further object of the invention is to provide apparatus for precision movement, placement and positioning which is also capable of motional response to select parameters such as temperature, pressure and weight for accurate sensing, determination, and measurement of such parameters, and for application in linear and non-linear springs, bellows, scales and deflection devices.

DISCLOSURE OF THE INVENTION

In order to accomplish these results, the invention provides apparatus for precise placement of an object or sensing or measurement of a parameter comprising a plurality of tilt plates in substantially parallel spaced apart relationship with first, second and third tilt plates in the generalized application. The invention also provides a plurality of hinge plates, one hinge plate secured to respective edges of each pair of tilt plates on one side of the pair of tilt plates. Each hinge plate is formed of unitary rigid elastic material for controlled elastic bending and recovery under applied bending moment stress.

According to the invention a plurality of spreaders and spreader actuators impart tilting motion to each pair of tilt plates by varying the spacing of the pair of adjacent tilt plates relative to each other at the side opposite the respective hinge plate. At least one spreader and spreader actuator is operatively coupled to each pair of adjacent tilt plates at the side opposite the respective hinge plate. The spreader imparts bending moment stress to the hinge plate on the opposite side and the hinge plate constrains the relative tilting motion of each tilting pair on a respective tilting axis.

A feature and advantage of the invention is that an object may be secured to the last tilt plate in the series or stages of substantially parallel tilt plates for precision placement or for parameter sensing and measurement. Thus, a workpiece or other object requiring handling may be placed or secured at the end tilt plate for precision placement in three dimensions with high accuracy and within demanding tolerances. Alternately, a position transducer or position indicator may be coupled to the end or top tilt plate for sensing and measuring the extent of motion.

The hinge plates secured to successive tilt plates of the multistaged apparatus and the respective tilt axes may be substantially parallel and on alternately opposite sides of the stack or column of tilt plates. According to this arrangement an object may be subject to a lateral component of motion left and right along the X axis of an XYZ coordinate system by actuating the spreaders on one side of the stack at a time and may be subject to extension and retraction along the Y axis of the XYZ coordinate system by actuating the spreaders on both sides of the stack simultaneously. According to another embodiment, the hinge plates secured to successive pairs of the tilt plates and the corresponding tilting axes are constructed and arranged substantially at right angles to each other on successive adjacent sides. By this arrangement an object secured to the upper or end tilt plate may be subject to a lateral component of motion left and right along the X axis or a lateral component of motion back and forth along the Z axis of an XYZ coordinate system by operation of only the spreaders on one side of the stack at a time.

A variety of arrangements are contemplated for the spreaders such as, for example, a threaded bolt in threaded engagement with one tilt plate of an adjacent pair, or a solenoid, either hydraulically or electrically actuated. The spreaders may be manually operated or automatically actuated for remote control or programmed control of fine adjustment and precision placement or movement. The threaded bolt may be actuated automatically and programmed by use of a worm wheel, worm gear and stepper motor.

On the other hand, the spreader may comprise a parameter responsive transducer or sensor such as a temperature sensitive, pressure sensitive or weight sensitive element for imparting bending moment stress to the hinge plates, imparting tilting motion to the tilt plates in proportion to the parameter to be sensed or measured. A position transducer or movement indicator coupled to the end tilt plate provides high accuracy parameter measurement. Strain gauges secured to the hinge plates may also be used to sense and measure motional response to parameters. The invention contemplates a variety of other applications including linear and non-linear springs, bellows, scales and deflection devices.

Any number of stages may be used in the unitary stack of coupled tilt plates and hinge plates for precise placement or parameter measurement. In typical applications two, three or five plates or stages are provided.

According to one specific application, apparatus is provided for retrofitting a work holder of the type having a platform for supporting a workpiece and translating means movably mounting said platform for movement of the workpiece toward and away from a working tool or other objective. The retrofitting apparatus comprises a base plate constructed and arranged to be rigidly secured to the work holder platform and a tilt positioning plate in substantially parallel spaced apart relationship relative to the base plate. A hinge plate rigidly secures respective edges of the base plate and tilt positioning plate on one side of the base plate and tilt positioning plate. The hinge plate is constructed and arranged according to the invention of rigid elastic material for controlled elastic bending and recovery under applied bending moment stress.

A spreader is coupled to the base plate and tilt positioning plate on the side opposite the hinge plate as heretofore described. A spreader actuator actuates the spreader for imparting tilting motion to the tilt positioning plate relative to the base plate by varying the spacing of the tilt positioning plate relative to the base plate and imparting bending moment stress to the hinge plate. Support arms or centers secured to the tilt positioning plate at the side adjacent the hinge plate support a workpiece over the hinge plate. A feature and advantage of this arrangement is that tilting motion of the tilt positioning plate is translated into a lateral component of motion of a workpiece mounted in the support arms or centers for fine adjustment and controlled precision motion along a lateral arc toward and away from a working tool or other objective. Using a threaded bolt for a spreader, and a worm wheel, worm gear and programmed stepper motor for an actuator, movement and in-feed increments in the order of 0.000025 to 0.000001 inches or centimeters are achieved.

More generally, the invention contemplates application of the multistaged apparatus for fine adjustment and precise movement on applicable work holders, work stations and robots, for parameter sensing and measurement and for linear and non-linear springs, scales, bellows, and deflection devices. A feature and advantage of the design according to the present invention is that there is no frictional sliding or movement of the stages relative to each other and therefore no slides or dovetails subject to wear or "clog". Furthermore, the precision placement or parameter measurement is not a function of lubrication or lack of lubrication. Other objects, features and advantages of the invention are apparent in the following specification and accompanying drawings.

BRIEF DESCRIPTION OF DRAWINGS

FIG. 3 is a detailed diagrammatic side view of the apparatus according to the invention used for retrofitting the work holder of FIG. 2.

FIGS. 6 and 7 are diagrammatic side views of further multistaged devices according to the invention with hinge plates and respective tilting axes parallel on alternately opposite sides of the stack of tilt plates and showing the use of solenoid spreaders.

FIGS. 8 and 9 are diagrammatic side views of further multistaged devices according to the invention with hinge plates and respective tilting axes at successive right angles to each other on adjacent sides of the stack so that in the example of the FIG. 9 the hinge plates form a rectangular spiral.

FIG. 10 is a perspective view of an XYZ coordinate axis for visualizing precise placement or movement of an object by the apparatus according to the invention in three dimensions and in which the X axis designates lateral motion left and right, the Z axis represents lateral motion back and forth and the Y axis represents vertical motion of extension and retraction.

DESCRIPTION OF PREFERRED EXAMPLE EMBODIMENTS AND BEST MODE OF THE INVENTION

Figure 2:
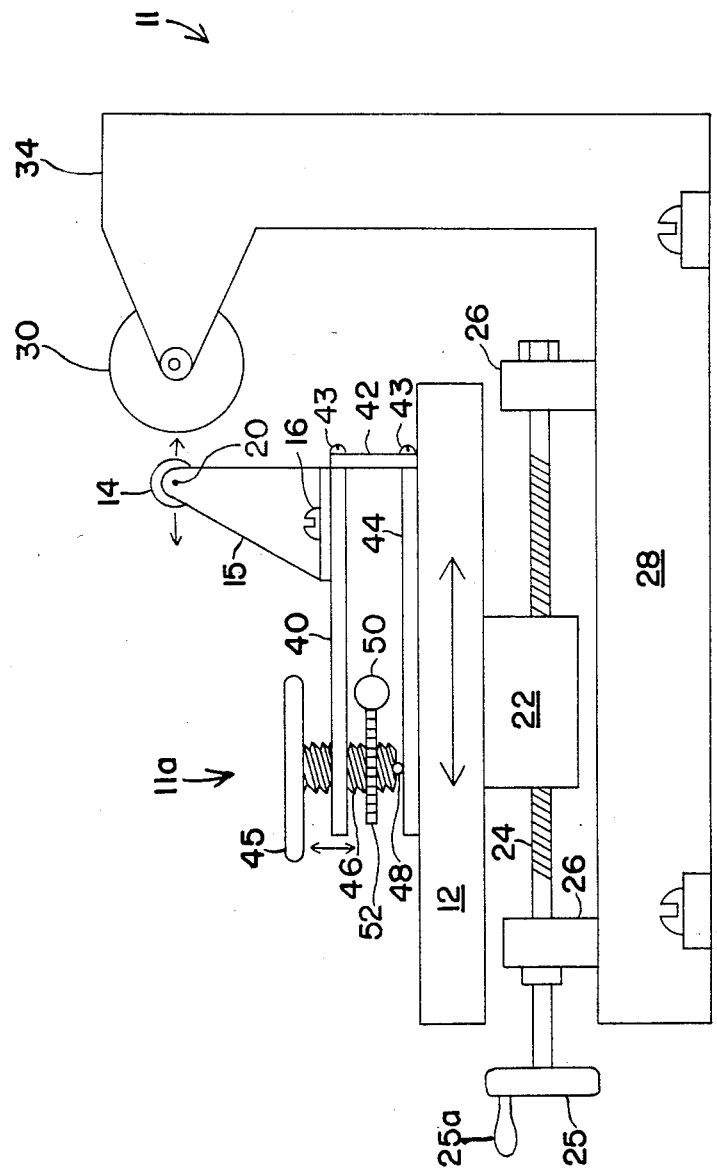
FIG. 2 is a diagrammatic side view of the grinding machine retrofitted according to the present invention for fine adjustment, precision placement or parameter measurement.

FIG. 2 illustrates a conventional grinding machine or similar machining device of the type illustrated in FIG.

Figure 1:
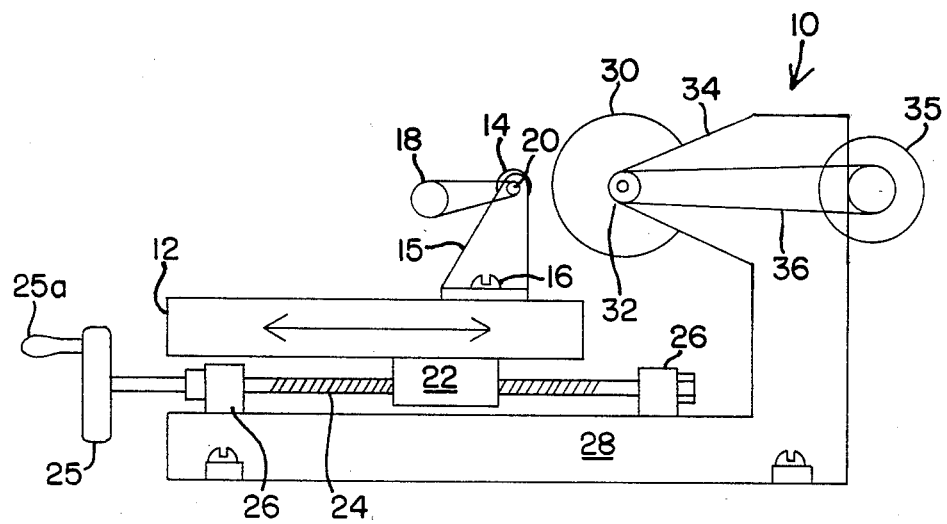
FIG. 1 is a diagrammatic side view of the conventional prior art grinding machine or similar workpiece machining device.

1 retrofitted according to the present invention for fine adjustment and precision placement of the workpiece. The elements of the retrofitted grinding or machining device 11 in FIG. 2 which are the same as the conventional grinding machine 10 illustrated in FIG. 1 are indicated by the same reference numerals. According to the invention, a base plate 44 of steel or other metal is immovably secured to the translating work holder platform 12 of the grinding machine. Translation of the platform 12 on sleeve 22 by means of lead screw 24 and handle 25 is used for the gross adjustment and in-feed of a workpiece. When the platform or translating table 12 is at the desired location and range, it is rigidly secured against further motion in the slides, ways, or tracks, not shown, by clamping or bolting.

The fine adjustment assembly according to the invention includes the base plate 44 secured to the platform 12 and a tilt positioning plate 40 substantially parallel and spaced from the base plate 44. A hinge plate 42 constructed of steel or other relatively rigid elastic material for controlled elastic bending and recovery is secured to respective edges of the base plate 44 and tilt positioning plate 40 by bolts or screws 43 along the length of the hinge plate. The dimension and material for hinge plate 42 are selected for controlled elastic bending and recovery under bending moment stress applied by the spreader in the form of threaded bolt 46 coupled between the tilt positioning plate 40 and base plate 44 on the side opposite hinge plate 42. The threaded bolt 46 is in threaded engagement with the tilt positioning plate 40 and is in contact engagement with base plate 44 by the rounded tip or bead 48. The spreader is actuated manually by a hand wheel 45 or automatically by a stepper motor or similar drive motor coupled to worm gear 50 which turns worm wheel 52 rigidly secured to the threaded bolt with the threaded bolt at the center axis of the worm wheel 52. Actuating the spreader imparts tilting motion to the tilt positioning plate 40 relative to the base plate 44 by varying the spacing of the tilt positioning plate and base plate at the side opposite hinge plate 42. Bending moment stress is therefore imparted to hinge plate 42 for elastic bending of the hinge plate which also constrains tilting motion of the hinge plate on an imaginary tilting axis at a location in this instance to the right of hinge plate 42.

The support arms or centers 15 mounted on the translating platform 12 in the example of FIG. 1 have been moved and according to the invention are secured to the tilt positioning plate 40 at the side adjacent to hinge plate 42 for supporting the workpiece 14 at a location spaced from the tilt positioning plate and over the hinge plate 42 and adjacent imaginary tilting axis. As a result of this configuration, tilting motion of tilt positioning table 40 is translated into a lateral component of motion of the workpiece 14 for fine adjustment and controlled precision motion substantially along a lateral arc as shown in FIG. 2 toward and away from the working tool 30 or other objective or target.

Thus, the conventional platform 12 and conventional translating arrangement of the work holder 11 is reserved for gross adjustment of motion of the workpiece 14 into the vicinity of the working tool or other objective. The platform 12 is then locked or clamped in stationary position. The fine adjustment and precision placement of the workpiece is thereafter accomplished by the apparatus 11a according to the invention retrofitting the conventional grinder or machining device. The retrofitting apparatus 11a according to the invention is abstracted from the conventional grinding machine base and shown separately for clarity in FIG. 3. Furthermore, some of the elements of the conventional grinding machine 10 illustrated in FIG. 1 have been left out of the diagram of FIG. 2 for simplicity.

A feature and advantage of the retrofitting apparatus 11a attached to the translating platform 12 is that the ordinary cylindrical grinder 10 or similar machining device with old, worn, or abused moving parts may be transformed into a precision machine capable of grinding or machining to tolerances far more accurate than the original machine. A temperature controlled area or more generally an environmentally controlled area may also provided commensurate with the greater precision and finer tolerances of the retrofitted machine.

As shown in FIG. 3, with the translating platform 12 clamped, operation of the hand wheel 45 or worm gear 50 rotates the spreader bolt 46 and bends or distorts the hinge plate 42. As a result of the length and location of the centers or support arms 15, the tilting motion up and down in a vertical direction of the tilt positioning plate 40 relative to base plate 44 is transformed into a substantially lateral component of motion back and forth by the workpiece 14 mounted at the outer end of the centers 15 along a substantially lateral arc toward and away from the working tool or other objective. The worm wheel 50 may be driven by a stepper motor or control motor in turn controlled by a microprocessor for automatic or programmed control of the in-feed in minute discrete increments.

Figure 5:
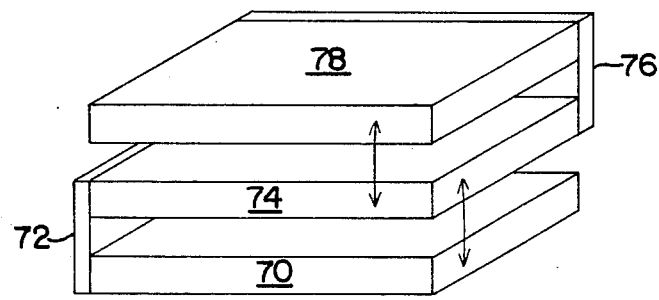
FIG. 5 is a diagrammatic perspective view of multistaged apparatus for precise placement and parameter measurement with the rigid elastic hinge plates on adjacent pairs of tilt plates and corresponding tilting axes at right angles relative to each other.

By way of example, the base plate 44 and tilt positioning plate 40 may be formed of ground steel plates having dimensions, for example, of $\frac{1}{2}" \times 6" \times 24"$ (1.27 cm $\times$ 15.24 cm $\times$ 60.96 cm). As a result of this thickness of the steel plate, the tilt plate and base plate are relatively inelastic and flat, that is inflexible and unbending under applied bending moment stress. In the illustrations of FIGS. 2 and 3 the elongate direction of the base plate 44 and tilt positioning plate 40 extends into the paper. The hinge plate 42 is therefore an elongate plate, for example, as shown in FIGS. 5 and 9. The hinge plate may be formed of ground steel with dimensions of, for example, $\frac{1}{8}" \times 2" \times 24"$ (0.32 cm $\times$ 5 cm $\times$ 60.96 cm). As a result of this lesser thickness, the hinge plate is relatively elastic for controlled bending or flexing under applied bending moment stress. The hinge plate 42 is secured to the base plate 44 and tilt positioning plate 40 by screws or bolts 43 which are spaced, for example, every $1\frac{1}{2}"$ (3.8 cm) along each edge. The centers 15 are, for example, approximately 6 inches (15.24 cm) long providing in-feed and out-feed along the lateral arc of approximately 6 inches (15.24 cm) radius.

For an elongate base plate 44 and tilt positioning plate 40, more than one spreader screw or bolt 46 and associated spreader bolt assembly are used and may be geared to rotate simultaneously using an elongate worm gear 50. In the example described above with base plate and tilt positioning plate approximately 2 feet (61 cm) in length, two spaced apart spreader bolts 46 have been found adequate. Using threaded screws or bolts 46 having 40 threads per inch (15.74 threads per cm) in-feed increments of 0.000025 inches or centimeters can be achieved manually by manual operation of the hand wheel 45 while in-feed increments of as small as 0.000001 inches or centimeters are possible using a step motor control coupled to worm gear 50.

Figure 4:
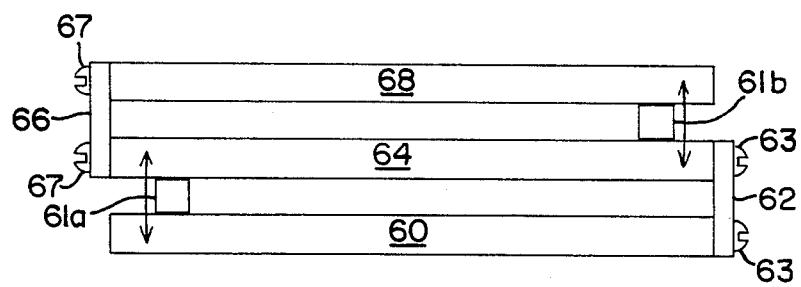
FIG. 4 is a diagrammatic side view of a multistaged apparatus for precise placement or parameter measurement according to the invention with the rigid elastic hinge plates between adjacent pairs of tilt plates and respective tilting axes parallel and on alternately opposite sides of the tilt plates.

More generalized embodiments of the present invention are illustrated in FIGS. 4 and 5 in which the multistage apparatus is applicable for use in, for example, micromanipulators, work stations, robots and sensing and measuring instruments. As shown in FIG. 4 a plurality of tilt plates 60, 64 and 68 are joined by a plurality of hinge plates 62 and 66 secured to respective edges of each adjacent pair of tilt plates. Hinge plates 62 and 66 are formed of rigid elastic material such as ⅛ inch ground steel plate as heretofore described and are secured to the respective edges by screws 63 and 67. In the example of 64 the hinge plates 62 and 66 are parallel and secured on opposite sides of the stack of tilt plates.

Spreader or spreaders 61a are coupled between the tilt plates 60 and 64 on the side opposite hinge plate 62 while spreader or spreaders 61b are coupled between the tilt plates 64 and 68 on the side opposite hinge plate 66. With reference to the XYZ coordinate system of FIG. 10, an object secured to or coupled to the surface of tilt plate 68 may be subject to a lateral component of motion left and right along the X axis of the XYZ coordinate system by actuating one of the sets of spreaders 61a or 61b at a time and may be subject to extension and retraction along the Y axis of the XYZ coordinate system by actuating both sets of spreaders 61a and 61b simultaneously.

The spreaders 61a and 61b may be threaded bolts with actuating mechanisms of the type described with reference to FIGS. 2 and 3 or they may be solenoids or other spreader mechanisms. For use as a parameter sensing and measuring device the spreaders 61a and 61b may be selected to be, for example, bellows devices sensitive to temperature or pressure for tilting the tilt plates and producing motion in response to environmental parameters such as temperature or pressure. Weight responsive elements may also be used. Indication or measurement of the motion of an object, for example, mounted on plate 68 such as a position transducer may be used to sense and measure the selected parameter such as temperature, pressure or weight to which the spreader devices 61a and 61b are responsive. Alternatively, strain gauges may be mounted on the hinge plates 62 and 66 to provide a measure of the bending strain imposed on the hinge plates and therefore providing a measure of the selected parameter to which the spreader devices 61a and 61b are responsive.

With spreaders or sensors 61a and 61b removed, the stack of tilt plates and hinge plates can itself function as a spring, bellows, or deflection device. With strain gauges applied to the hinge plates, the stack then functions as a weighing scale. Alternatively, passive motion sensors or transducers may be substituted for the spreaders for sensing motion and deflection.

In the alternative arrangement of FIG. 5 the plurality of tilt plates 70, 74, and 78 are joined by hinge plates 72 and 76 secured to respective edges of each adjacent pair of tilt plates but arranged at right angles relative to each other on adjacent sides of the stack of tilt plates. The hinge plates are joined to the respective edges of the tilt plates in the manner, for example, described with reference to FIG. 4. In the example configuration of FIG. 5 an object secured to the tilt plate 78 may be subject to a lateral component of motion left and right along the X axis of the XYZ coordinate system of FIG. 10 by actuation of a spreader not shown coupled between plates 70 and 74 on the side opposite hinge plate 72. Similarly, an object secured to the surface of tilt plate 78 may be subject to a lateral component of motion back and forth along the Z axis of the XYZ coordinate system of FIG. 10 by operation of a spreader, not shown, coupled between tilt plates 74 and 78 on the side opposite hinge plate 76. With spreaders or sensors removed this stack also functions as a spring, bellows, deflection device or scale.

In each of the examples of FIGS. 4 and 5 the lower tilt plate 60 or 70 may provide a reference base plate and be secured in stationary position. Referring to FIG. 4, operation of spreaders 61a would therefore provide tilting motion of the first tilt plate relative to base plate 60 while operation of spreaders 61b produces tilting motion of the second tilt plate 68 relative to the first tilt plate 64.

The apparatus for precise placement or parameter measurement illustrated in FIG. 4 is shown in FIG. 6 with solenoid spreaders 65a and 65b for automatic operation as may be required, for example, in application of the device in a micromanipulator. The apparatus is extended with further multiple stages in FIG. 7 for greater movement of an object or sensor coupled to the upper tilt plate.

Referring to FIG. 7 there is included a base plate 80 which may be fixed in a stationary position and first, second, third and fourth tilt plates 84, 88, 92 and 96 in spaced apart parallel relationship forming a stack. The tilt plates may be formed, for example, of ⅛ inch ground steel plate. Adjacent pairs of the tilt plates are joined at the respective edges of adjacent pairs by unitary hinge plates 82, 86, 90 and 94 joined to the respective edges by rows of screws or bolts. The hinge plates as heretofore described are composed of rigid elastic material such as, for example, ⅛ inch ground steel plate for elastic bending and recovery in response to bending moment stresses imparted by the solenoid spreaders 85a, 85b, 85c and 85d. The hinge plates joining adjacent pairs of tilt plates are formed on alternately opposite sides of the stack in substantially parallel orientation.

In this configuration an object or sensor coupled to the top of the stack may be subject to an accentuated lateral component of motion right and left along an arc in the general direction of the X axis of the XYZ coordinate system shown in FIG. 10 by operation of the solenoid spreaders 85a and 85c together on one side of the stack or by operation of the solenoid spreaders 85b and 85d together on the other side of the stack. Furthermore, accentuated motion in the vertical direction along the Y axis of the XYZ coordinate system may be effected by simultaneous operation of all of these solenoid spreaders.

It is apparent that the stack of multiple tilt table stages, for example, as illustrated in FIG. 7 provides an effective mechanical motion amplifier. The motional effect along the X and Y coordinate axes may be further increased, amplified or accentuated by the addition of further stages in the manner shown in FIG. 7. Furthermore, by substituting parameter responsive motion producing sensing elements for the solenoid spreaders, the stack functions as a sensing and measuring device.

FIGS. 6 and 7 represent end views of tilt table stacks according to the invention which may be elongated and of varying length in the direction perpendicular into the sheet of drawings. According to the selected length, each of the solenoid spreaders 85a, 85b, 85c and 85d may represent a row of solenoid spreaders coordinated with each other for imparting uniform bending moment along the length of the respective pair of tilt plates. The solenoid spreaders may be, for example, hydraulically or electrically actuated and controlled.

A tilt table stack of the type illustrated in FIG. 5 is also shown in FIG. 8 in which the hinge plates 72 and 76 are constructed and arranged at right angles relative to each other joining the edges of adjacent pairs of tilt plates at the abutting sides of adjacent pairs. A pair of solenoid spreaders 75a are coupled between the base plate 70 and tilt plate 74 toward the side opposite hinge plate 72 for imparting bending moment stress to hinge plate 72. The row of solenoids 75b at right angles to the row of solenoids 75a is coupled between tilt plate 74 and 78 toward the side opposite hinge plate 76 for imparting bending moment stress to hinge plate 76. The tilt table stack of this type is extended with further multiple stages in the apparatus of FIG. 9 for accentuating the motion of an object or sensor coupled to the end or top of the stack.

Referring to FIG. 9, there is provided a base plate 100 hidden from view behind hinge plate 102 and first, second, third, and fourth tilt plates 104, 108, 112 and 116 respectively in spaced apart substantially parallel relationship forming the stack. Adjacent pairs of tilt plates are joined at respective edges of the adjacent pairs by unitary hinge plates 102, 106, 110 and 114 secured to the respective edges of the adjacent pairs by bolts or screws. The hinge plates at successive pairs of adjacent tilt plates are constructed and arranged at successive right angles and in the example of FIG. 9 form a rectangular right turning spiral in the upward direction. Solenoid spreaders 105a, 105b, 105c, and 105d are coupled between the succesive adjacent pairs of tilt plates juxtaposed on the side of the stack opposite the respective hinge plate subjected to bending moment stress by the respective solenoid spreaders.

According to the tilt stack configuration of FIG. 9, operation of either solenoid spreaders 105a or 105c will impart to an object or sensor coupled at the top or end of the stack a lateral component of motion back and forth along an arc in the general direction of the Z axis of the XYZ coordinate system of FIG. 10. Operation of either spreader solenoids 105b or spreader solenoids 105d alone will impart a lateral component of motion left and right along an arc generally in the X axis direction. Operation of solenoid spreaders 105b and 105d together, operation of solenoids 105a and 105c together, or operation of all solenoids together produces a vertical component of motion along the Y axis. A lesser motion is achieved by operation of solenoids 105b and 105d together or 105a and 105c together while a greater component of motion along the vertical Y axis is achieved by operation of all solenoids together.

As heretofore described with reference to FIG. 4, the spreaders may constitute temperature sensitive, pressure sensitive, or weight sensitive elements responsive to ambient or applied parameters for accurate sensing and measurement of the parameter according to the motion imparted to a position sensor or indicator coupled to the end or top of the stack. Alternatively, strain gauges may be applied to the respective hinge plates for measurement of applied strain.

In each of the foregoing example embodiments of the invention implementing the stack of a plurality of tilt plates and hinge plates, the spreaders or sensors may be removed so that the stack of tilt plates and hinge plates can itself function as a spring, bellows, or deflection device. Generally, the plurality of hinge plates are selected to have the same dimensions and structural characteristics for relative linearity and proportionality in the contributions to the overall deflection of the stack from each of the hinge plates. However, non-linear and unusual deflection curves may be achieved by incorporating into the stack, hinge plates of different elastic parameters and bending characteristics. Thus, the various hinge plates then yield in different amounts to a common force effectively providing a non-linear spring or deflection device. This embodiment of the invention is applicable to stacks of multiple tilt plates and hinge plates even greater in number than the examples shown in the drawings, for example, stacks of 5, 7, or 9 tilt plates or greater.

A weight placed on the top plate of such a stack according to this embodiment of the invention results in application of bending moment stress and deflection on all of the hinge plates of the stack. With hinge plates of similar characteristics the uniform contribution of the hinge plates results in a generally linear type movement of the weight or object. A desired non-linear or unusual deflection motion can be achieved by incorporating hinge plates of differing structural parameters at the different locations on the side of the stack. With the application of strain gauges on the respective hinge plates the linear and non-linear stack deflection devices may function as linear or non-linear weighing scales or other measuring devices.

Another application of the invention as a bellows is illustrated in the alternative of FIG. 6 shown in dotted outline. According to this example, the tilt plate 64 is formed with a central clearance hole 64a so that an elongate spreader, in this instance elongate solenoid 65c, extends between the base plate 60 and the top tilt plate 68 passing through the clearance hole 64a in the central tilt plate 64. The solenoid spreaders 65a and 65b are eliminated. Actuation of the single solenoid spreader 65c produces movement of the multistage or multiplate stack in which the bottom plate and top plate remain generally parallel with respect to each other as the hinge plates 62 and 64 deform equally.

A similar application may be incorporated, for example in FIG. 7, with an elongate spreader extending between the bottom plate or base plate 80 and the top tilt plate 96 through clearance holes formed through all of the intermediate tilt plates. An overall movement of the top tilt plate relative to the base plate while the two remain in parallel relationship is then achieved with the total motion exceeding that which could be achieved through the use of any single hinge or lesser number of hinges. Such a device is analogous to a bellows providing expansion and contraction in a bellows-like movement.

In the application of the present invention to weighing scales and to motion sensing, the unitary stack of tilt plates and hinge plates has been described with the application of strain gauges on the hinge plates. With the application of strain gauges to the hinge plates, the spreader devices between the tilt plates may be, for example, removed. According to an alternative example of the invention, rather than applying strain gauges to the hinge plates for motion sensing and weighing, passive motion sensors are substituted for the spreaders at the locations of the spreader devices between the tile plates. According to this example embodiment, instead of spreaders which function as prime movers for imparting bending moment stress to the hinge plates, passive motion sensors or transducers at the same location sense and measure the motion and deflection of the tilt plates from a common force or weight applied, for example to the top plate.

The invention may thus be constructed and arranged according to alternative embodiments for precise positioning, movement or placement on the one hand, accurate parameter sensing and measurement on the other hand, and as scales, springs, bellows, or deflection devices and all in the context of a variety of applications including grinders, machine tools, work holders, manipulators, robots, measuring instruments, etc. While the invention has been described with reference to particular example embodiments, it is intended to cover all variations and equivalents within the scope of the following claims.

I claim:

1. Apparatus for precise placement of an object or measurement of a parameter comprising:
   a base plate;
   a first tilt plate in parallel spaced apart relationship relative to the base plate;
   a first hinge plate rigidly secured to respective edges of the base plate and first tilt plate on one side of the respective base plate and first tilt plate, said hinge plate constructed and arranged of rigid elastic material for controlled elastic bending and recovery under applied bending moment stress;
   first spreader means operatively coupled to the base plate and first tilt plate on the side of the base plate and first tilt plate opposite the hinge plate, and first spreader actuator means for actuating the spreader means and imparting tilting motion to the first tile plate relative to the base plate by varying the spacing of the first tilt plate relative to the base plate at the side of the first tilt plate and base plate opposite the first hinge plate thereby imparting bending moment stress to the first hinge plate, said first hinge plate constraining the tilting motion on a first tilting axis;
   a second tilt plate in parallel spaced apart relationship relative to the first tile plate;
   a second hinge plate rigidly secured to respective edges of the first and second tilt plates on one side thereof, said second hinge plate constructed and arranged of rigid elastic material for controlled elastic bending and recovery under applied bending moment stress;
   second spreader means operatively coupled to the first and second tilt plates at the side of the first and second tilt plates opposite the second hinge plate, and second spreader actuator means for actuating the second spreader means and imparting tilting motion to the second tilt plate relative to the first tilt plate by varying the spacing of the first and second tilt plates at the side of the first and second tilt plates opposite the second hinge plate thereby imparting bending moment stress to the second hinge plate, said second hinge plate constraining the tilting motion on a second tilting axis;
   whereby an object may be coupled to the second tilt plate for precision placement or for parameter measurement indication upon actuation of the respective spreader means.

2. The apparatus of claim 1 wherein the first hinge plate and first tilting axis are constructed and arranged substantially at right angles to the second hinge plate and second tilting axis whereby an object secured to the second tilt plate may be subject to a lateral component of motion left and right along the X axis and a lateral motion back and forth along the Z axis of an XYZ coordinate system (FIG. 10) by operation of only one of the spreading means at a time.

3. The apparatus of claim 1 wherein the first and second spreader means each comprise threaded bolt means in threaded engagement with one tilt plate and in pressing contact engagement with an adjacent tilt plate.

4. The apparatus of claim 3 wherein the first and second spreader actuating means for actuating the threaded bolt means each comprise a worm wheel fixedly secured to the threaded bolt means and a worm gear for driving the worm wheel.

5. The apparatus of claim 1 wherein the spreader means comprise solenoid means.

6. The apparatus of claim 5 wherein the spreader actuator means comprise electrical actuating means.

7. The apparatus of claim 1 further comprising a third tilt table in spaced apart substantially parallel relationship with the second tilt table;
   a third hinge plate rigidly secured to respective edges of the second and third tilt plates on one side thereof, said third hinge plate constructed and arranged of rigid elastic material for controlled elastic bending under applied bending moment stress;
   third spreader means operatively coupled to the second and third tilt plates at the side opposite the third hinge plate and third spreader actuator means for actuating the third spreader means and imparting tilting motion to the third tilt plate relative to the second tilt plate by varying the spacing of the second and third tilt plates at the side opposite the third hinge plate thereby imparting bending moment stress to the third hinge plate, said third hinge plate constraining the tilting motion on a third tilting axis;
   and a fourth tilt plate in substantially parallel spaced apart relationship relative to the third tilt plate;
   a fourth hinge plate rigidly secured to respective edges of the third and fourth tilt plates on one side thereof, said fourth hinge plate constructed and arranged of rigid elastic material for controlled elastic bending under applied bending moment stress;
   fourth spreader means operatively coupled to the third and fourth tilt plates at the side opposite the fourth hinge plate and fourth spreader actuator means for actuating the fourth spreader means and imparting tilting motion of the fourth tilt plate relative to the third tilt plate by varying the spacing of the third and fourth tilt plates at the side opposite the fourth hinge plate thereby imparting bending moment stress to the fourth hinge plate, said fourth hinge plate constraining the tilting motion on a fourth tilting axis;
   whereby an object may be coupled to the fourth tilt plate for precision placement or for parameter measurement indication upon actuation of the spreader means.

8. The apparatus of claim 7 wherein the first and third hinge plates and first and third tilt axes are substantially parallel and constructed and arranged substantially at right angles to the second and fourth hinge plates and second and fourth tilting axes.

9. The apparatus of claim 1 wherein the spreader actuator means comprise ambient temperature responsive spreader actuator means.

10. The apparatus of claim 1 wherein the spreader actuator means comprise pressure responsive spreader actuator means.

11. Apparatus of claim 1 further comprising strain gauge means applied to said hinge plates for measuring the magnitude of tilting motion.

12. Apparatus for precise placement of an object or measurement of a parameter comprising:
   a plurality of tilt plates in substantially parallel spaced apart relationship and including at least first, second and third tilt plates;
   a plurality of hinge plates, one hinge plate secured to respective edges of each adjacent pair of tilt plates on one side of the adjacent pair of tilt plates, each hinge plate constructed and arranged of rigid elastic material for controlled elastic bending and recovery under applied bending moment stress;
   and at least one spreader means operatively coupled between two tilt plates and spreader means for actuating the spreader means and imparting relative motion to the tilt plates by varying spacing of the tilt plates relative to each other thereby imparting bending moment stress to the hinge plates, each said hinge plate elastically constraining the relative tilting motion of a tilting pair;
   whereby an object may be applied to the last tilt plate for precision placement or parameter measurement indication by controlling actuation of the spreader means by the respective spreader actuator means.

13. The apparatus of claim 12 wherein the spreader means is operatively coupled between the first and third tilt plates and wherein the second tilt plate is formed with a clearance hole for passage of the spreader means without interference from the second tilt plate.

14. Apparatus of claim 12 further comprising strain gauge means applied to said hinge plates for measuring the magnitude of tilting motion.

15. Apparatus for retrofitting a work holder of the type having a platform for supporting a workpiece and translating means movably mounting said platform for movement of a workpiece toward and away from a working tool or other objective comprising:
   a base plate constructed and arranged to be rigidly secured to the work holder platform;
   a tilt positioning plate in substantially parallel spaced apart relationship relative to the base plate;
   a hinge plate rigidly secured to respective edges of the base plate and tilt positioning plate on one side of the respective base plate and tilt positioning plate, said hinge plate constructed and arranged of rigid elastic material for controlled elastic bending and recovery under applied bending moment stress;
   spreader means operatively coupled to the base plate and tilt positioning plate on the side opposite the hinge plate and spreader actuator means for actuating the spreader means and imparting tilting motion to the tilt positioning plate relative to the base plate by varying the spacing of the tilt positioning plate relative to the base plate at the side opposite the hinge plate thereby imparting bending moment stress to the hinge plate, said hinge plate constraining the tilting motion on a tilting axis;
   support arm means secured to the tilt positioning plate at the side thereof adjacent to the hinge plate for supporting a workpiece at a location spaced from the tilt positioning plate and over the hinge plate and tilting axis whereby tilting motion of the tilt positioning table is translated into a lateral component of motion of a workpiece mounted in the support arm means for fine adjustment of controlled precision motion substantially along a lateral arc toward and away from a working tool or other objective, said platform and translating means of the work holder providing gross adjustment of motion of a workpiece.

16. The apparatus of claim 15 wherein the spreader means comprises threaded bolt means in threaded engagement with one of the tilt positioning plate or base plate, said threaded bolt in contact engagement with the other plate for spreading and varying the spacing between the tilt positioning plate and base plate at the side opposite the hinge plate.

17. The apparatus of claim 16 wherein the spreader actuating means comprises a worm wheel rigidly secured to the threaded bolt with the threaded bolt at its center axis and a worm gear operatively engaging the worm wheel and control motor means operatively engaging and driving the worm gear.

18. The apparatus of claim 17 wherein the control motor means comprises stepper motor means for control of the worm gear, worm wheel and threaded bolt and therefore the variable spacing of the base plate and positioning plate at the side opposite the hinge plate in discrete increments.

19. Apparatus for precise placement of an object or measurement of a parameter comprising:
   a base plate;
   a tilt plate in parallel spaced apart relationship relative to the base plate, said base plate and tilt plate being constructed and arranged to be relatively inelastic and flat under applied bending moment stress;
   a first hinge plate rigidly secured to respective edges of the base plate and tilt plate on one side of the respective base plate and tilt plate, said hinge plate constructed and arranged to be relatively elastic for controlled elastic bending and recovery under applied bending moment stress;
   spreader means operatively coupled to the base plate and tilt plate on the side of the base plate and tilt plate opposite the hinge plate, and spreader actuator means for actuating the spreader means and imparting tilting motion to the tilt plate relative to the base plate by varying the spacing of the tilt plate relative to the base plate at the side of the tilt plate and base plate opposite the hinge plate thereby imparting bending moment stress to the hinge plate, said hinge plate constraining the tilting motion on a tilting axis;
   said tilt plate remaining inelastic and flat relative to the hinge plate so that an object may be coupled to the tilt plate for precision placement or for parameter measurement indication upon actuation of the spreader means.

20. A deflection device comprising:
   a plurality of tilt plates in substantially parallel spaced apart relationship and including at least first, second and third tilt plates, said tilt plates being constructed and arranged to be relatively inelastic and flat under applied bending moment stress;
   a plurality of hinge plates, one hinge plate secured to respective edges of each adjacent pair of tilt plates on one side of the adjacent pair of tilt plates, each hinge plate constructed and arranged to be relatively elastic for controlled elastic bending and recovery under applied bending moment stress, said plurality of tilt plates and hinge plates forming a unitary stack responsive to an applied load or weight by deflection and recovery of the hinge plates while the tilt plates remain inelastic and flat relative to the hinge plates;

and at least one sensor means operatively coupled between at least two tilt plates for sensing relative motion of the tilt plates in response to an applied load or weight, each said hinge plate elastically constraining the relative tilting motion of a tilting pair.

21. The apparatus of claim 19 further comprising support arm means secured to the tilt plate at the side adjacent to the hinge plate for supporting an object at a location spaced from the tilt plate and over the hinge plate so that tilting motion of the tilt plate is translated into a lateral component of motion of the object mounted on the support arm.

* * * * *